Jan. 6, 1959  D. H. MacDONALD  2,867,707
ELECTRIC WEIGHING CELL
Filed Feb. 17, 1956

INVENTOR.
DENNISON H. MAC DONALD
BY
Ward Neal Haselton Orme & McElhannon
ATTORNEYS

United States Patent Office 2,867,707
Patented Jan. 6, 1959

2,867,707

ELECTRIC WEIGHING CELL

Dennison H. MacDonald, East Haven, Conn., assignor to Revere Corporation of America, Wallingford, Conn., a corporation of New Jersey Application February 17, 1956, Serial No. 566,165

5 Claims. (Cl. 201—63)

This invention relates to load measuring cells, or so-called weighing cells and more particularly to devices of that class embodying strain gauges preferably, although not necessarily, of the form wherein filaments or the like of electrical resistance material are bonded or otherwise applied to a column which is subjected to the loads to be measured.

Load measuring cells of this general class and of a form which has heretofore been widely used are disclosed in the U. S. patent to Thurston No. 2,488,349 granted on November 15, 1949. Such cells are designed to provide highly accurate responses and, among other reasons, with a view to averaging any inaccuracies in the responses of the various different strain gauges therein, the gauges as shown in said patent are mounted on a plurality of parallel columns. But the use of such pluralities of columns involves the necessity of providing a mounting base and also a load receiving member, both of which are pieces of metal separable from the columns. Such an arrangement involves the rather expensive task of carefully finishing the surfaces of the ends of the columns and the surfaces on the base and load receiving member which engage the columns, so that the engaging surfaces will be in uniform contact. Also, such an arrangement involves the use of a diaphragm-like cover for the casing of the cell arranged, so as to flex in vertical directions whereby the load receiving member may apply loads to the column without interference by the cover. Also, such diaphragm-like cover is made relatively rigid in horizontal directions to prevent sidewise displacement of the load receiving member or sidewise deflection of the parts which might introduce sidewise bending forces in the columns, thus interfering with the accuracy of the responses of the gauges. Furthermore, it is desirable with these constructions so to use the diaphragm-like cover as to apply a "pre-load" to the columns to eliminate so-called "no-load" signals and consequent possible inaccuracies.

The present invention provides an improved and greatly simplified and relatively inexpensive construction which will avoid the necessity of resorting to most of the expedients above referred to for insuring that the cell will give responses accurate to the degree required for most uses of such weighing cells.

In accordance with the invention a single column member is provided, preferably of circular cross-section and formed integrally with a mounting base portion as well as with a load receiving portion. The strain gauge or gauges are mounted on the side surface areas of such column intermediate its length and are surrounded by a casing, the lower portion of which is preferably permanently welded upon and is carried by the mounting base, whereas the upper edges of such casing are closed by a novel form of annular resilient member permanently sealed as by welding both with respect to the load receiving portion of the column and to the upper edge of the surrounding casing. Such closure means is preferably of a form which will allow flexure both in vertical and horizontal directions. For example, one desirable shape is generally of the form of a funnel with its smaller diameter portion embracing and sealed wtih respect to the load receiving portion of the column and having its lower, larger diameter flared peripheral portion sealed with respect to the top edge of the casing. The closure is so shaped in cross-section that its lower outwardly flared portion comes substantially into a horizontal plane whereas toward its upper portions it is curved inwardly and more and more upwardly so that where it embraces the load receiving means it is of substantially cylindrical shape, or if desired, formed with a somewhat outwardly flared upper portion sealed with respect to the column member.

With a closure and casing of this particular form, the column means including its base and load receiving portions is free to assume its desired positions with respect to any support upon which it rests and with respect to the applied load and without any substantial possibility that the cover and its closure will interfere with or modify the stress conditions in any part of the integral column means when same is put under varying loads. That is, due to the shape of the resilient closure member, it does not restrict either vertically or horizontally the stress conditions in the column element.

The construction also embodies novel features permitting the cell to be permanently and hermetically sealed in such a way as to avoid any likely danger of interference with the accuracy of the device.

Other more specific objects, features and advantages of the invention will appear from the detailed description given below, taken in connection with the accompanying drawings which form a part of this specification and illustrate by way of example a presently preferred embodiment of the invention.

Figure 1:
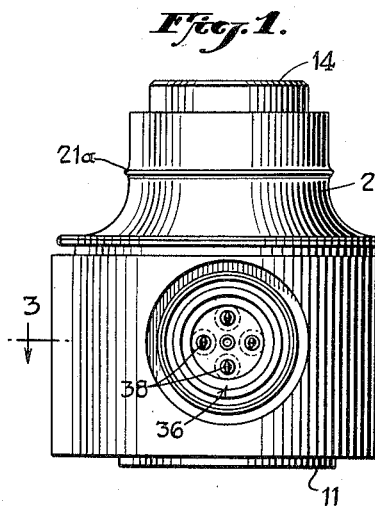
Fig. 1 is a side elevational view of the presently preferred embodiment of the invention.

Referring to the drawings in further detail, the column element includes a cylindrical intermediate portion 10, an enlarged mounting base portion 11, and a load receiving socket portion 12, all these portions being integrally formed of steel, for example, and preferably, although not necessarily, all portions thereof are of circular cross-section. The mounting base portion on its underside may, if desired, be formed with a threaded socket 13 adapting the device to be mounted on the top of a jack, for example, in case the cell is to be used for weighing a vehicle or the like, and in which event some part of the vehicle as supported by the jack would rest within the socket 14 formed at the upper end of the column means.

The base portion 11 is made of a diameter substantially larger than the portion 10 so as to form a stable base, and also whereby a space as at 15 will be available within the casing and around the portion 10 for receiving the connections to strain gauges as at 16. The upper part of the base portion may merge for example as a generally conical portion 17 into the cylindrical portion 10.

The strain gauges may be of the filament resistance type indicated and which are bonded to sheets of plastic material, the latter in turn being bonded to the side surfaces of the column. With this type of gauge, it will be understood that as the column is subjected to compression, the wire or filament of the gauges will be subjected to strain thereby tending to alter the cross-section thereof, thus giving a change of resistance which may be measured for example with a Wheatstone bridge arrangement as described in the above-mentioned Thurston patent.

Alternatively, one or more filament resistance strain gauges may be provided of the form which is helically wound around the column as shown in Fig. 7, for example, of said Thurston patent, or preferably as disclosed in the copending application of Dennison H. MacDonald and Thomas S. Harris, Jr., Serial No. 577,726, filed April 12, 1956, now Patent No. 2,837,620, issued June 3, 1958.

With such helically wound types of strain gauges it will be understood that when the column is subjected to compression its diameter will tend to enlarge according to Poisson's ratio with the result that the resistance filament embracing same will tend to be stretched and elongated thereby increasing its resistance thus giving a change of resistance measurable by a Wheatstone bridge circuit or otherwise.

The casing for enclosing the gauges and the portions of the column carrying same may comprise a generally cylindrical main body portion 18, the inside of the lower portion of which is formed at 18' with a diameter such as to closely fit around and embrace the mounting base portion 11 of the column. In order permanently to seal the two parts together at this region, the mounting base is formed with an annular groove 19 and the casing portion 18 is formed with a similar annular groove 20. Between these grooves the two parts are formed with downwardly projecting annular abutting flange portions, the protruding edges of which are welded together forming an annular permanently closed seam at 19a. The forming of the weld on the edges of such protruding flanges makes it possible to apply the necessary heat for quickly heating the edges to welding temperature without dissipation of any substantial amount of heat back into the column and casing parts, and thus without danger of distorting or causing undesirable strains therein which might interfere with the accurate operation of the device.

The resilient closure means for the casing as above referred to is shown at 21 and may comprise, as indicated, a generally funnel-shaped thin resilient sheet metal member the smaller diameter portion of which as at 22 is substantially cylindrical and embraces a flange 23 formed around the load receiving portion 12. The flared lower portion 24 of the closure member, as indicated, is preferably shaped to conform to a horizontal plane and the rim of this portion as at 25 is welded to a horizontally protruding flange portion 25a on casing 18, the form of such weld being like that above described in connection with the flanges 19 and 20 and for similar purposes. A weld of this type is particularly advantageous for securing and sealing the edge of such closure member 21 permanently in place while avoiding any such heating of the casing and its closure as would cause uneven expansion conditions and the establishment of troublesome strains in any part of the device.

The upper edge of the closure member 21 is also preferably welded as at 26 in a similar way to the flange 23 on the load receiving portion.

Thus with the form of weld such as shown at 19a, 25a, and 26, the parts 18 and 21 may be readily placed in position about the column means as shown, and then permanently welded to the column to provide a hermetically sealed enclosure without danger of establishing undesired strains in any part of the device and without materially heating any active portions thereof.

In case the assembly has to be taken apart at any time for inspection, repair or replacement of the strain gauges or for other reasons, this may readily be accomplished by grinding off the welded edge portions 19a, 25a and 26 and after the parts have been reassembled, such welds may again be made, to hermetically seal the enclosure.

In order to afford greater resilience, the closure means, if desired, may also be formed with one or more annular corrugations as at 21a located along a horizontal plane or planes intermediate the upper and lower edges of the closure member.

In view of the resilience of the closure member 21 in both vertical and horizontal directions, such member will at no time tend to subject the column means to strains in either of said directions or tend to restrict the free compression and expansion of the column means as it is subjected to varying loads. It will be appreciated that the upper portion 22 of the closure means, being in the form of a cylindrical tubular portion, would tend rigidly to restrain the upper portion of the column means against deflection, if the lower part of any such cylindrical portion were rigidly fixed in position. But since the cylindrical portion 22 merges with an arcuate cross-section into the horizontal flange portion 24, it will be apparent that the cylindrical portion 22 is left relatively free for sidewise deflection. It is also left free for deflection vertically in view of the corrugation or corrugations 21a (if used) and especially in view of the horizontal flexible portion 24 and the curved portions by which portions 22 and 24 merge into each other. The closure member 21 may for example be formed of steel such as is used for flexible diaphragms and of a thickness of, for example, $\frac{1}{64}''$ more or less.

It should be noted that the casing portion 18 preferably terminates at its lower edge 30 at an elevation slightly above the lower surface 31 of the column means. Thus, if the cell rests upon a flat support, the load will be carried entirely on the surface 31 of the column means, and the edge 30 of the casing portion 18 will not receive any of the weight and accordingly the casing will not tend to be deflected in any way such as might apply distorting forces to the column means.

An arcuately shaped strip as shown at 33 may be mounted upon a flange portion 34 within casing 18 and extend around the column means and for carrying spools as at 35 having thereon temperature compensating resistances and the like for purposes such as explained in said Thurston patent.

The electrical connections to the gauges and resistances within the casing may be carried out through connection means indicated generally at 36. This may be inserted in a circular opening in the side of the casing and permanently welded along an annular seam as at 37, the weld formation being like those above described at 25a and 26. The inner end wall of the member 36 may be formed with apertures in which are contained connector elements 38 sealed and insulated with respect to the aperture edges as by small masses of glass 39, whereby the connection leads may be brought out of the casing while retaining the casing hermetically sealed. The output connection wires as at 40 may run from the connector elements 38 out through a hollow ferrule-like member 41 which is filled with suitable insulation compound as at 42. The inner end of the ferrule member may be suitably fixed in a groove as at 43 formed in the member 36. In order to relieve mechanical strains on the wires 40 which might tend to pull these wires out, they may be surrounded by hollow metal tubular piece 44, the inner end of which is flared as at 45 to engage against the restricted throat portion 46 in member 41. The member 44 may be squeezed inwardly about the wires with an annular groove formation as at 47 so as to firmly grip the wires against being pulled out.

In order to evacuate the interior of the casing after the connection wires are sealed in place, a small tube as at 48 may extend out through the middle of member 36 and also through this tube if desired, the interior of the casing may be filled with an inert gas, or, if preferred, with an insulation liquid, such as oil, to reduce temperature gradients in the cell. After the casing has been evacuated and then thus filled, the outer end of tube 48 may be sealed in any suitable way before applying the protective guard 41.

It will be apparent that, with the above described construction, the entire load receiving means may comprise a single integral member including a column, its supporting base and its load receiving portions which member may be inexpensively and accurately formed to a predetermined shape in a lathe. Thus, it is unnecessary to go to the expense of accurately fitting a plurality of load receiving elements in respect to each other or of grinding and lapping their surfaces to insure their accurate engagement. Further, since the load carrying means is a single integral member, there are no inter-engaging load receiving surfaces therein which might tend to cause inaccurate or unintended responses under low load or no load conditions. Thus so-called preloading of the column means with a small load as heretofore customary, is not necessary with the present invention.

Furthermore, with the present invention while the gauge means and compensating resistances are permanently and hermetically sealed within a casing, the casing is such that it will not at any time tend to restrain or apply any frictional forces to the column means such as might interfere with accurate responses.

Figure 4:
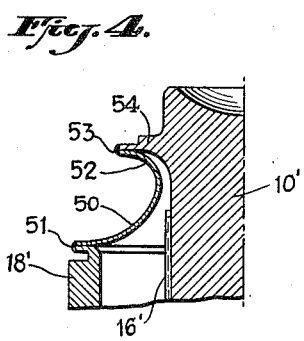
Fig. 4 is a fragmentary vertical sectional view showing portions of an alternative embodiment of the invention.
Figure 2:
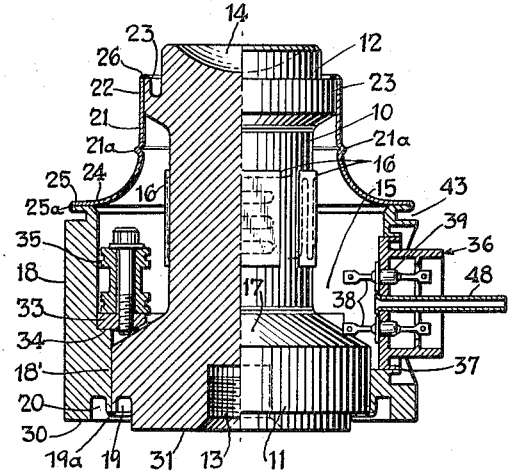
Fig. 2 is another view partly in elevation and partly in section taken substantially along line 2—2 of Fig. 3.
Figure 3:
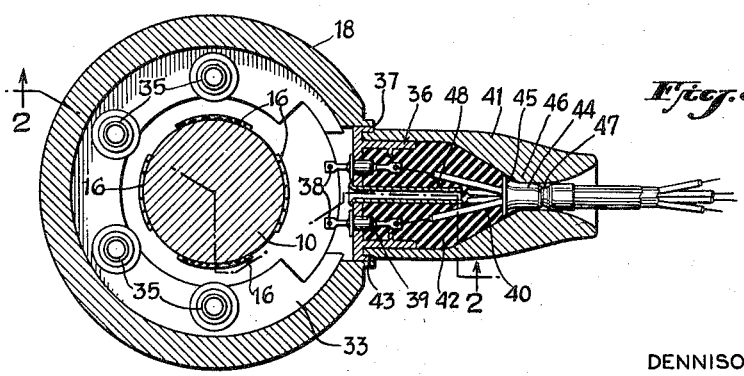
Fig. 3 is a horizontal section of the same embodiment of the invention, taken substantially along line 3—3 of Fig. 2.

A somewhat modified form of flexible closure means is shown at 50 in Fig. 4, this form being of a shape such that a vertical section through the wall thereof is generally arcuate. The lower outwardly flared edge may be welded as at 51 to the casing member 18' in the same manner as weld 25a in Fig. 2. The upper portion 52, it will be noted, is also outwardly flared somewhat and may be welded as at 53 with respect to a flange formation 54 formed on the column means 10', this weld being also like that shown at 51.

While for convenience in describing the parts, certain of same are referred to as having "upper" and "lower" portions, etc. as shown in the drawings, it will be understood that the apparatus in use might be inverted or otherwise positioned as compared with the upright position shown in the drawings.

Although a certain particular embodiment of the invention is herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. A load measuring cell comprising in combination, a single column member integrally formed with a supporting base portion at one end and a load receiving portion at the other end, electrical strain gauge means applied to surface areas on an intermediate portion of said column member, a rigid casing surrounding said column member and providing therein a space in which said strain gauge means and connections thereto are located, said casing having a lower portion which extends around in embracing relation to said column member and is sealed in respect thereto, and an annular closure member for sealing the upper end edge of said casing with respect to the column member, the upper end of which closure member engages and is sealed with respect to the column member, portions of such closure member beneath its upper sealed end being directed downwardly and thence being curved outwardly to flare into a peripheral portion substantially in a plane generally perpendicular to the column member and sealed with respect to said upper end edge portion of the casing, said closure member being formed of thin sheet metal, and, due to its downwardly and outwardly flared shape, being resilient in both horizontal and vertical directions with respect to the column portions which it surrounds.

2. A load measuring cell in accordance with the foregoing claim 1 and in which the upper portion of said closure member is substantially cylindrical.

3. A load measuring cell in accordance with the foregoing claim 1 and in which the closure member at its upper end is flared outwardly, the resulting outwardly flared edge being sealed with respect to the column.

4. A load measuring cell in accordance with the foregoing claim 1 and in which said column member at its base extends below the rigid casing and its load receiving member at the top extends above said closure.

5. A load measuring cell in accordance with the foregoing claim 1 and in which said column means is formed with integral protruding thin flange portions at the locations respectively where same is sealed with respect to the casing and closure and such flange portions respectively being welded at their edges to the casing and closure.

References Cited in the file of this patent

UNITED STATES PATENTS

| | | |
|---|---|---|
| 2,488,347 | Thurston | Nov. 14, 1949 |
| 2,576,417 | Ruge | Nov. 27, 1951 |
| 2,737,051 | Sanderson | Mar. 6, 1956 |